(12) United States Patent
Hollenberg et al.

(10) Patent No.: US 6,221,211 B1
(45) Date of Patent: Apr. 24, 2001

(54) MULTI-PLY TISSUES HAVING INTERNAL INDICIA

(75) Inventors: David Henry Hollenberg, Neenah; Patricia Mary Exarhos, Appleton; Brigitte Kay Weigert, Neenah; Lorrie Lynn Krynock, Appleton, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 08/192,027

(22) Filed: Feb. 4, 1994

(51) Int. Cl.[7] ................................................. D21H 27/00
(52) U.S. Cl. .................... 162/123; 162/126; 162/132; 162/134; 162/158; 162/161
(58) Field of Search .................................... 162/112, 134, 162/123, 126, 127, 132, 158, 161

(56) References Cited

U.S. PATENT DOCUMENTS

| 2,143,682 | * | 1/1939 | Brown ................................. | 162/126 |
| 4,504,357 | * | 3/1985 | Holbein et al. ....................... | 162/134 |

FOREIGN PATENT DOCUMENTS

| 1268262 | * | 3/1972 | (GB) .................................. | 162/126 |
| 63-270896 | * | 11/1988 | (JP) ..................................... | 162/134 |

* cited by examiner

Primary Examiner—Peter Chin

(57) ABSTRACT

A multi-ply tissue contains an internal indicia, such as a printed pattern applied to the center ply, which is visible through the outer plies of the tissue and which indicates the presence of some unique ingredients within the tissue product.

19 Claims, 2 Drawing Sheets

MULTI-PLY TISSUES HAVING INTERNAL INDICIA

BACKGROUND OF THE INVENTION

A standard tissue is normally white or of a uniform color. In some instances decorative patterns may be printed on the outside of the tissue to enhance its appeal to the consumer. Nevertheless, tissues having additional special ingredients such as lotions, virucides, encapsulated menthol, and the like do not have a visually distinctive appearance relative to standard tissues. Instead, they are white, colored or printed just like other tissues and rely on their packaging to convey to the consumer that they have distinctive properties or characteristics. It would be advantageous if tissues containing special ingredients could be visually distinguished from other tissues.

SUMMARY OF THE INVENTION

It has now been discovered that certain tissues, such as those useful as facial or bath tissues, can be provided with a distinctive visual cue or indicator which indicates that such tissues contain unique ingredients or properties relative to conventional or "normal" tissues. This visual indicator is accomplished by printing, dyeing, or otherwise coloring an internal surface of one or more plies of a multi-ply tissue. Because of the relative transparency of the thin tissue sheets used in multi-ply tissue products, the color or pattern imparted to the internal surface is visible through the outer ply, thereby providing an internal indicia that the tissue contains special ingredients. The visibility of the internal indicia can be controlled by the basis weight of the outer plies and the intensity or pattern of the coloration. The appearance of the internal indicia can also be altered by coloration or patterns on one or both outer plies. Regardless of the particular color or pattern chosen for the internal indicia, the presence of the outer ply creates a softened image or coloration which is very distinctive.

Hence in one aspect, the invention resides in a tissue comprising two or more plies and thereby having two or more internal ply surfaces, two of said plies being outer plies, wherein one or more of said internal ply surfaces contains a colored or patterned indicia which is visible through at least one of said outer plies. The plies can be attached to each other by crimping the edges, gluing, or other suitable means. The outer plies may or may not be patterned or colored to further enhance the perception of differences between or among the plies.

In another aspect, the invention resides in a multi-ply tissue comprising two outer plies and one or more center plies, at least one of said center plies containing a colored or patterned indicia which is visible through both outer plies. The number of center plies can be one, two, three or more. Multi-ply tissues having three or four total plies are particularly suitable.

In a further aspect, the invention resides in a two-ply tissue, wherein one of the internal ply surfaces contains a colored or patterned indicia which is visible through both plies.

The tissue products of this invention are especially suitable as facial or bath tissues, but can also be used for paper towels and the like whenever there is a need to provide a distinctive internal indicia. The basis weight of the outer plies must be sufficiently low to enable the internal indicia to be visible. By this is meant that an ordinary user can detect the indicia with the naked eye during normal use. In some instances, lightweight outer plies may also be desireable to allow the special additive or ingredient to pass from the inner plies to the outside surface of the tissue upon receiving light pressure during pressing or rubbing. This can be particularly desireable for lotions or fragrances, for example. The tissue sheets used as the outer plies can have a basis weight of from about 10 to about 60 grams per square meter, more suitably from about 10 to about 45 grams per square meter. If the basis weight is too great, the opacity of the tissue sheet will prevent the indicia from showing through. To this end, regardless of the basis weight and fiber composition of the outer plies, the opacity of the outer plies should be less than about 85 as measured by TAPPI T-425.

The internal indicia can be any pattern or color which shows through the outer plies. Suitable patterns particularly include, without limitation, decorative patterns which represent objects, such as floral patterns, caricatures, and the like. Other suitable patterns include geometric and abstract patterns, such as repeating dots, squares, rhomboids, triangles and the like. Also suitable are solidly colored (or substantially solidly colored) center plies which are different in color than one or both outer plies. For example, a center ply can be dyed blue or green and placed between two white outer plies. This can indicate to the user that the center ply contains a medicant or some ingredient not present on the outer plies. This is particularly advantageous for a three-ply virucidal tissue as disclosed in U.S. Pat. No. 4,738,847 entitled "Multi-ply Virucidal Product" issued Apr. 19, 1988 to Rothe et al., which is hereby incorporated by reference. Such products contain a colorless virucidal composition substantially confined to the center ply, which in fact would not be visually detectable without some kind of indicia. In the case of a two-ply product, the indicia can be suitably applied to the internal ply surface(s) of one or both plies. Alternatively, using a layered headbox, the fibers of an inner layer of a multilayered sheet can be colored differently from the fibers forming the other layers, including dispersing colored fibers among the other fibers of an inner layer.

The internal indicia can be applied to the tissue product by any technique suitable for this purpose. Such techniques include, without limitation, printing, spraying, beater dyeing the fibers, coating, and the like. The indicia can be solid colors or patterns. The indicia can include other ingredients, such as virucides, emollients, encapsulated scents, and the like. Alternatively, these other ingredients can be separately applied, which application can be coextensive with the indicia or not. For example, a virucide can be sprayed or printed over the entire surface of a center ply, while the indicia can be a printed ink or dye pattern. Alternatively, the virucide can be incorporated into the indicia ink so that the indicia marks the portions of the tissue that contain the virucide. Either way, the indicia indicates the presence of the virucide (or other additive) in the tissue.

Suitable ingredients which can be incorporated into the tissue product in conjunction with the internal indicia include, without limitation, virucides, emollients, cleansing agents, moisturizers, softening agents, encapsulated fragrances such as menthol, eucalyptus, bayberry, and potpourri, and the like.

These and other aspects of the invention will be further described in connection with the Drawing and Examples.

DETAILED DESCRIPTION OF THE INVENTION

Figure 1:
FIG. 1 is a cut-away plan view of a three-ply tissue in accordance with this invention, illustrating a center ply having a printed pattern internal indicia.

FIG. 1 is a cut-away plan view of a three-ply tissue in accordance with this invention. As shown, outer ply 2 overlays inner ply 3, which contains a printed decorative floral pattern 4.

Figure 2:
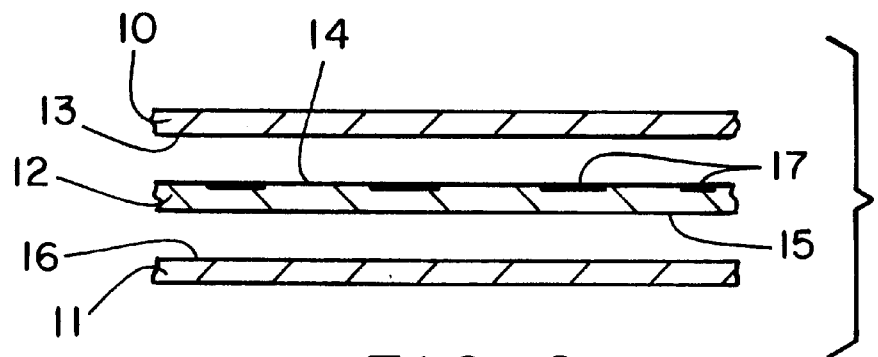
FIG. 2 is a schematic cross-sectional view of the tissue of FIG. 1, illustrating the relationship among the three plies.

FIG. 2 is a schematic cross-sectional view of a three-ply tissue in accordance with this invention. Shown is a first outer ply 10, a second outer ply 11, a single inner ply 12, internal ply surfaces 13, 14, 15, and 16, and an internal indicia pattern of printed ink deposits 17. The printed ink deposits represent the floral pattern depicted in FIG. 1.

Figure 3:
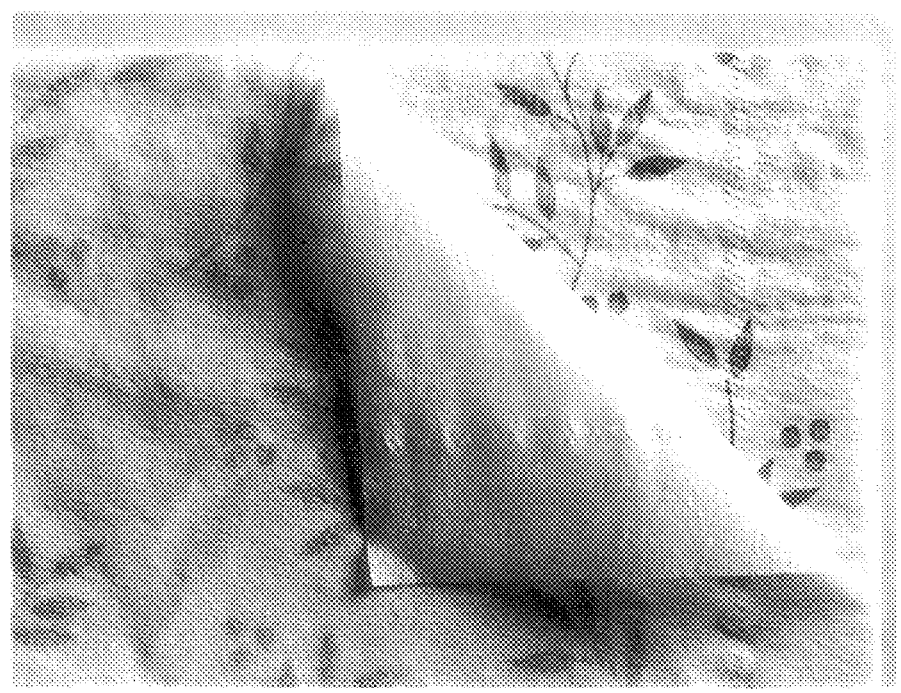
FIG. 3 is a photograph of a three-ply tissue in accordance with this invention, in which one outer ply has been partially peeled back to expose the printed center ply.

FIG. 3 is a photograph of a three-ply facial tissue as depicted in FIGS. 1 and 2. All three plies are white. The center ply contains an internal indicia consisting of a green printed floral pattern, which is visible through the outer plies as shown. For a virucidal tissue, for example, the center ply could be separately treated overall with a suitable virucide, with the presence of the floral pattern indicating that the center ply contained the virucide. Of course, the floral pattern internal indicia could represent the presence of many other ingredients or additives as herein described.

Figure 4:
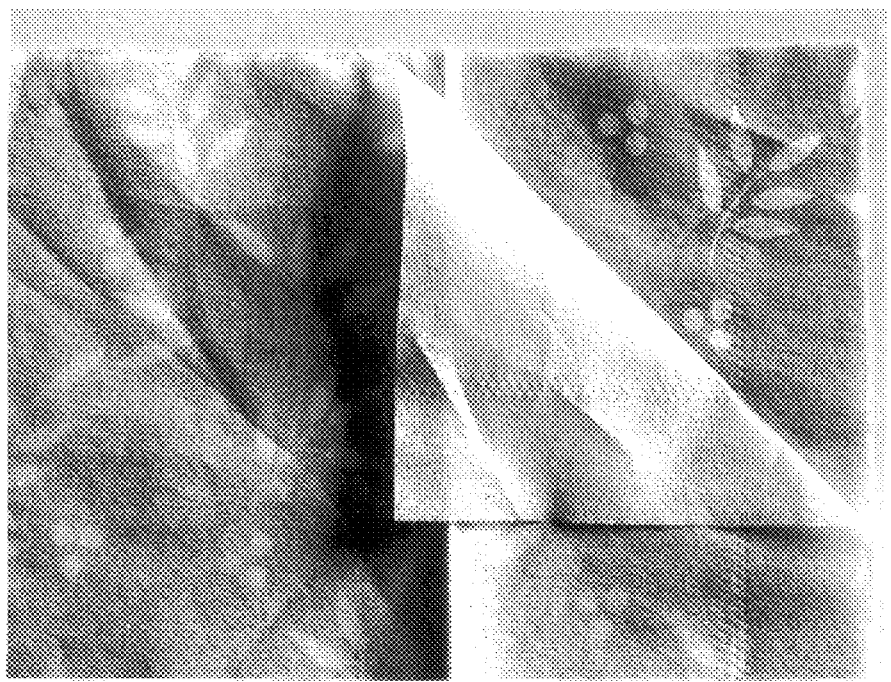
FIG. 4 is a photograph of a three-ply tissue in accordance with this invention, similar to that of FIG. 3.

FIG. 4 is a photograph of a three-ply facial tissue similar to that of FIG. 3, but in which the center ply was printed green substantially overall, leaving an unprinted pattern of white portions in the same floral pattern of FIG. 3. In this embodiment, because of the substantially overall printing of the inner ply, the virucide or other additive can be incorporated into the green printing medium to get substantial coverage, provided the virucide or other additive is compatible with the colorant. Of course, the virucide or other ingredient could also be applied separately as would likely be the case in the FIG. 3 embodiment.

Figure 5:
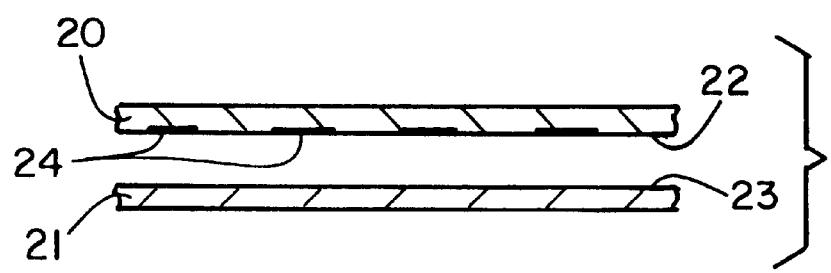
FIG. 5 is a schematic cross-sectional view similar to that of FIG. 2, but for a two-ply tissue in accordance with this invention.

FIG. 5 is a schematic cross-sectional view of a two-ply product of this invention, similar to FIG. 2. Shown are outer plies 20 and 21, internal ply surfaces 22 and 23, and internal indicia 24. For a two-ply product, it is desireable that the internal indicia be muted sufficiently by the thickness of the two plies to be apparent that the internal indicia is present on the inside of the product rather than on the outside in order to distinguish from conventional printed tissues.

EXAMPLES

Example 1

A roll of three-ply white creped tissue, each ply having a basis weight of 9 pounds per 2880 square feet (15.2 grams per square meter), was separated into one roll of two-ply tissue and one roll of single-ply tissue. The two-ply roll was unwound and passed through a flexo-graphic printer, which printed a colored (green) floral pattern internal indicia on the top ply as illustrated in FIG. 3. The printed two-ply sheet was then passed through a spray applicator, which sprayed a virucidal solution onto the surface of the printed ply. The virucidal solution consisted of about 37 weight percent citric acid, about 19 weight percent malic acid, about 25 weight percent sodium lauryl sulfate, and about 20 weight percent water. The spray area coverage on the surface of the printed ply was about 100 percent. The add-on amount of the virucidal solution was about 2.8 milligrams of solids per square inch (6.45 square centimeters).

The previously-separated single-ply sheet was then recombined with the printed/treated two-ply sheet such that the single-ply sheet covered the printed/treated ply. Hence the printed/treated ply became the inner ply of the resulting three-ply tissue. The recombined three-ply tissue was passed through a flat bed dryer having a temperature of about 300° F. (149° C.). The foregoing process was carried out on pilot equipment at a speed of about 250 feet per minute (77 meters per second).

The resulting three-ply product appeared as illustrated in FIG. 3, having an internal indicia which was visible through both outer plies.

Example 2

A three-ply virucidal tissue was produced substantially as described in Example 1, except the printed pattern substantially covered the entire sheet, leaving unprinted white areas having a floral pattern.

The resulting three-ply product appeared as illustrated in FIG. 4, having an internal indicia which was visible through both outer plies.

Example 3

A three-ply tissue was prepared as described in Example 1. The three-ply tissue was then passed through a rotogravure printing station where a silicone emulsion was applied to both outer plies. The resulting virucidal tissue had good softness as well as being virucidally effective.

It will be appreciated that the foregoing figures and examples, given for purposes of illustration, are not to be construed as limiting the scope of this invention, which is defined by the following claims and all equivalents thereto.

We claim:

1. A tissue comprising two or more plies and thereby having two or more internal ply surfaces, two of said plies being outer plies, wherein one or more of said internal surfaces contains a colored or patterned indicia which is visible through at least one of said outer plies.

2. The tissue of claim 1 consisting of two plies.

3. The tissue of claim 2 wherein only one of said internal ply surfaces contains a colored or patterned indicia.

4. The tissue of claim 3 wherein the indicia is a printed pattern.

5. The tissue of claim 1 comprising two outer plies and a center ply.

6. The tissue of claim 5 wherein the center ply contains a colored or patterned indicia.

7. The tissue of claim 6 wherein the indicia is a printed pattern.

8. The tissue of claim 5 wherein the indicia is a solid color different from the color of the outer plies.

9. The tissue of claim 5 wherein the center ply contains a virucide.

10. The tissue of claim 5 wherein the center ply contains an emollient.

11. The tissue of claim 5 wherein the center ply contains an encapsulated fragrance.

12. The tissue of claim 11 wherein the fragrance is menthol.

13. The tissue of claim 1 consisting of four plies.

14. A three-ply facial tissue comprising two outer tissue plies and an inner tissue ply crimped together at the edges of the plies, said inner ply containing a virucide and a colored or patterned indicia which is visible through both outer plies.

15. The tissue of claim 14 wherein the inner ply is a solid color which is different than the color of the outer plies.

16. The tissue of claim 15 wherein the inner ply is blue or green and the outer plies are white.

17. The tissue of claim 14 wherein the indicia is a pattern.

18. The tissue of claim 17 wherein the indicia is a floral pattern.

19. The tissue of claim 17 wherein the inner ply is printed with a substantially overall solid color with a pattern of unprinted areas.

* * * * *